Oct. 7, 1941.  F. COZZOLI  2,258,408
AMPOULE SEALING MACHINE
Filed Aug. 19, 1939  4 Sheets-Sheet 2

WITNESSES
Geo. W. Naylor
A. L. Kitchin

INVENTOR
Frank Cozzoli
BY
Munn, Anderson & Liddy
ATTORNEYS

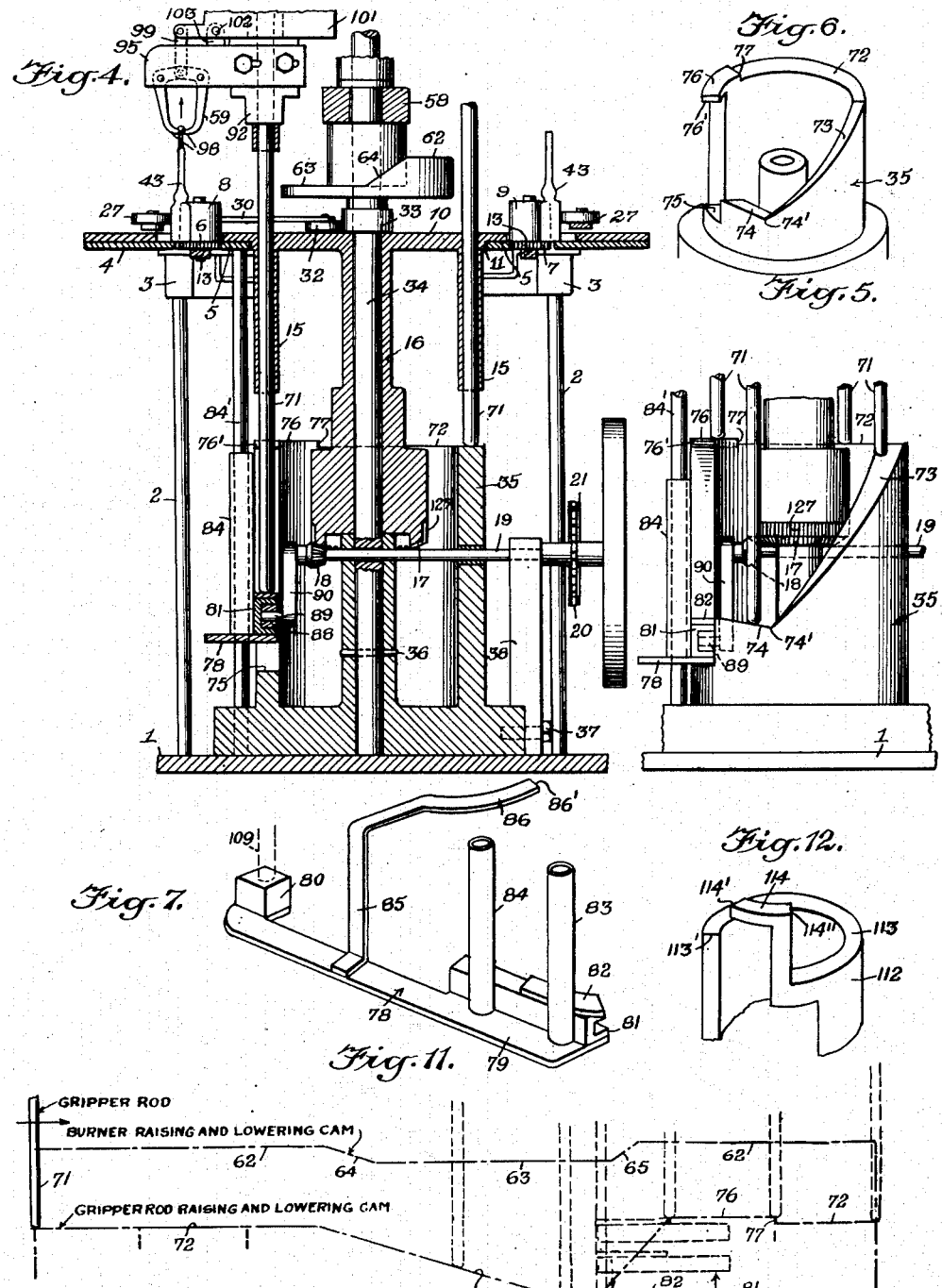

Oct. 7, 1941.  F. COZZOLI  2,258,408
AMPOULE SEALING MACHINE
Filed Aug. 19, 1939  4 Sheets-Sheet 4
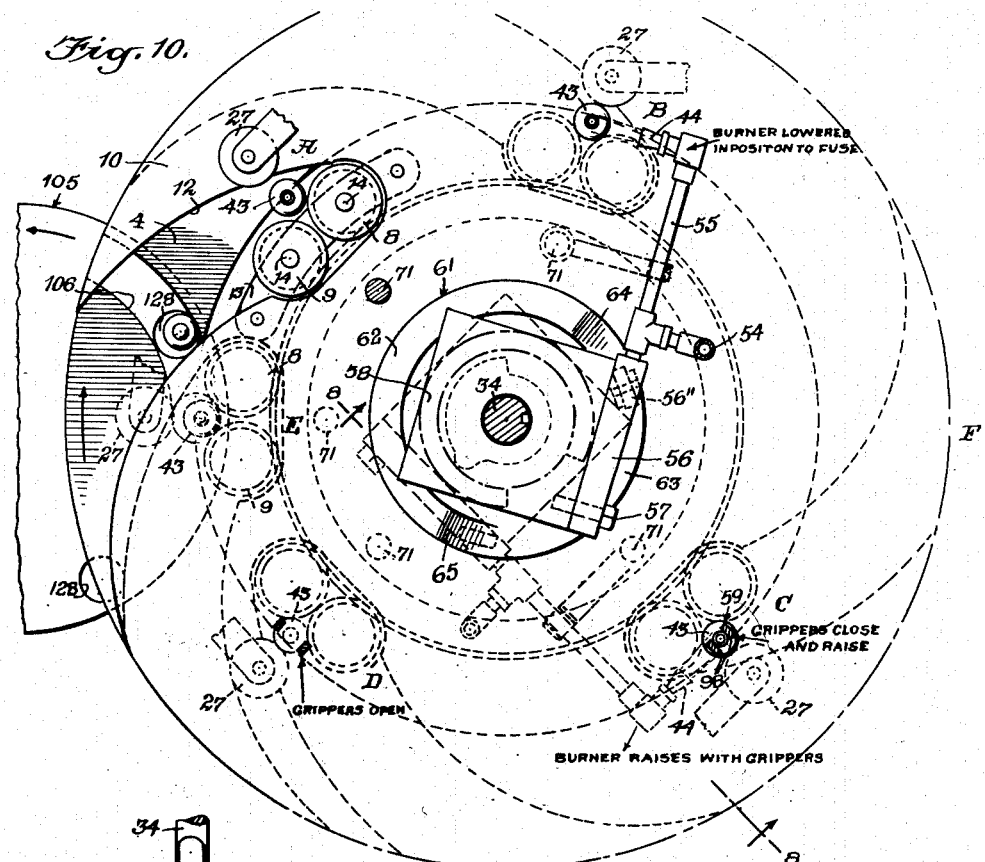
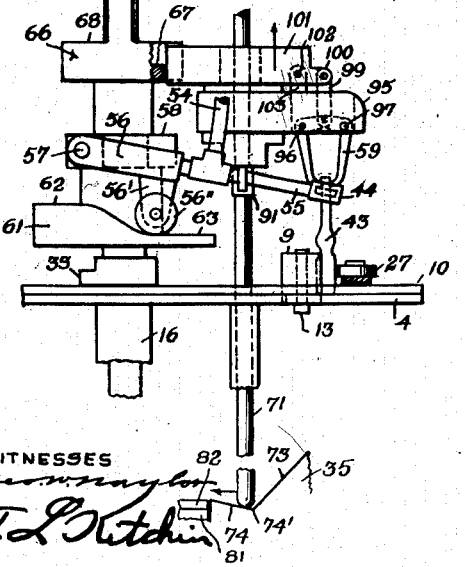
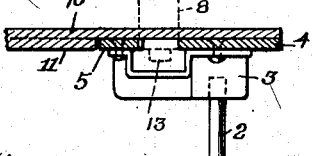
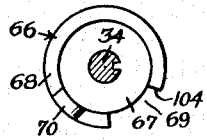
INVENTOR
Frank Cozzoli
BY
Munn, Anderson & Liddy
ATTORNEYS Patented Oct. 7, 1941

2,258,408

UNITED STATES PATENT OFFICE 2,258,408

AMPOULE SEALING MACHINE

Frank Cozzoli, Plainfield, N. J.

Application August 19, 1939, Serial No. 290,997

15 Claims. (Cl. 226—80)

This invention relates to a sealing machine for sealing glass ampoules and particularly to an improved machine for sealing ampoules after the ampoules have been filled, an object being to provide a construction which will properly seal the ampoule without injuring the same or the contents thereof.

Another object of the invention is to provide a sealing machine wherein glass ampoules may be sealed in quick succession.

A further object of the invention is to provide an ampoule sealing machine wherein the filled open ampoules are fed in at one point and the sealed ampoules are discharged at a second point.

A further and more specific object of the invention is to provide an ampoule sealing machine wherein a flame for softening and even melting the glass of the ampoule is provided and, in addition, a gripping, twisting and pulling device is used to quickly bring the softened parts of the glass together in a way to effect an immediate and quick sealing action.

In the accompanying drawings—

Fig. 1a is a fragmentary side view of a gripping structure and associated parts;

Fig. 4 is a sectional view through Fig. 2 approximately on the line 4—4;

Fig. 5 is a side view of the cam and associated parts shown in Fig. 4;

Fig. 6 is a perspective view on a reduced scale of the cam shown in Fig. 5;

Fig. 7 is a perspective view of an elevating structure embodying certain features of the invention;

Fig. 8 is a fragmentary side view of a portion of the center part of the structure shown in Fig. 1 and illustrating how the burner is raised substantially at the same time as the gripping structure;

Fig. 9 is a fragmentary sectional view illustrating a connecting bracket, a stationary supporting ring, a stationary gear and associated parts forming certain features of the invention;

Fig. 10 is a view partly in plan and partly in diagram illustrating the different stations of operation and how the filled ampoules are taken from an entrance point and moved around to a discharge point;

Fig. 11 is a diagram showing the action of certain cams and gripping rods embodying certain features of the invention;

Fig. 12 is a perspective view of a support coacting with the structure shown in Fig. 7 and embodying certain features of the invention;

Fig. 13 is a fragmentary sectional view through Fig. 1 on the line 13—13, showing the gripping-actuating cam in elevation; and Fig. 14 is a fragmentary sectional view through Fig. 2 approximately on the line 14—14.

Figure 1:
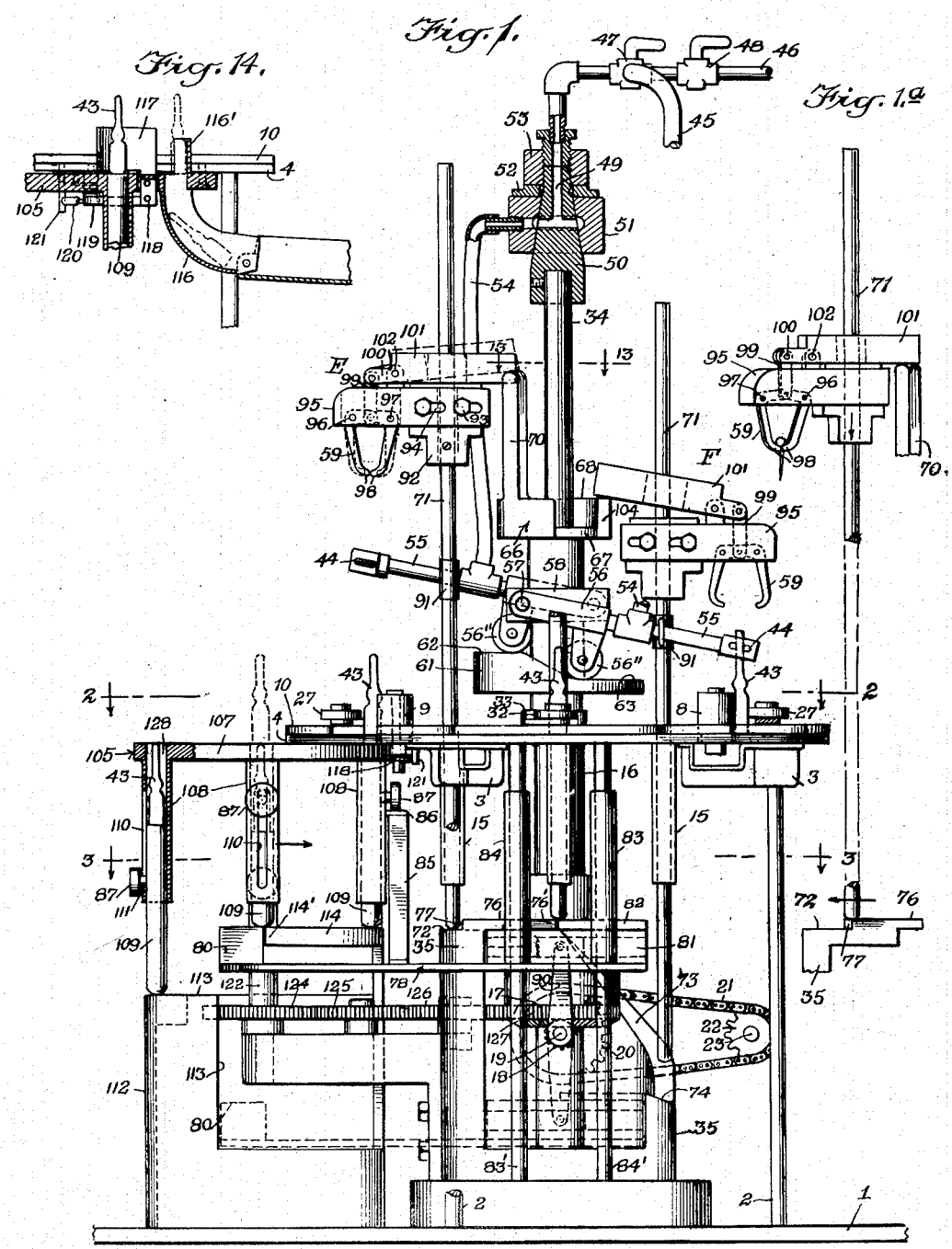
Fig. 1 is a side view of an ampoule sealing machine disclosing an embodiment of the invention, certain parts being shown in section and certain parts being omitted for the purpose of clearness.

Referring to the accompanying drawings by numerals, 1 indicates a base of any kind, as for instance, a plate of metal and to this base is secured in any suitable way a number of uprights 2, which at their upper ends are secured to the various connecting brackets 3 (Fig. 6). As shown in the accompanying drawings, there are three of the uprights 2 and also three brackets 3, but if desired a greater number of uprights or brackets could be used without departing from the spirit of the invention.

As shown in Fig. 9, the bracket 3 is riveted or otherwise rigidly secured to a stationary supporting ring 4 and to a stationary ring gear 5. A space is provided between ring 4 and gear 5 so that the respective gears 6 and 7 may continually mesh with the gear ring and be caused to function to rotate the respective rollers 8 and 9. Extending over the gear 5 and ring 4, is a rotatable notched plate 10 (Figs. 2 and 4) having a thickened portion 11 arranged within the gear ring 5. As shown particularly in Fig. 2, the plate 10 is provided with a number of arc-shaped notches 12. Four notches are shown but a less number or a greater number might be used without departing from the spirit of the invention. Arranged at the inner end of each of the notches is a bar 13 riveted to plate 10 and through this bar journal pins 14 and 15 extend, said journal pins also being rigidly secured to the respective gears 6 and 7 and to the rollers 8 and 9. As shown in Fig. 4, the plate 10 is provided with a number of tubular downwardly extending members 15 and a centrally positioned downwardly extending tubular member 16 merging into a bevel gear 17 and also gear 127. A pinion 18 rigidly secured to a shaft 19 continually meshes with gear 17, so that whenever the shaft 19 is rotated plate 10 will be rotated. A sprocket wheel 20 is secured to shaft 19 and this sprocket wheel accommodates a chain 21 driven by a second sprocket wheel 22 rigidly secured to a drive shaft 23. Shaft 23 may be driven by an electric motor or any other suitable power means. As long as shaft 23 is rotating plate 10 will also rotate by reason of the structure just described and as this plate rotates it will pull the bar or plate 13 along and, consequently, will cause the rollers 8 and 9 to rotate by reason of the fact that the gear wheels 6 and 7 are rigidly secured thereto and are continually in mesh with the gear ring 5. The plate 10 is adapted to rotate as indicated by the arrow 24 in Fig. 2.

Figure 2:
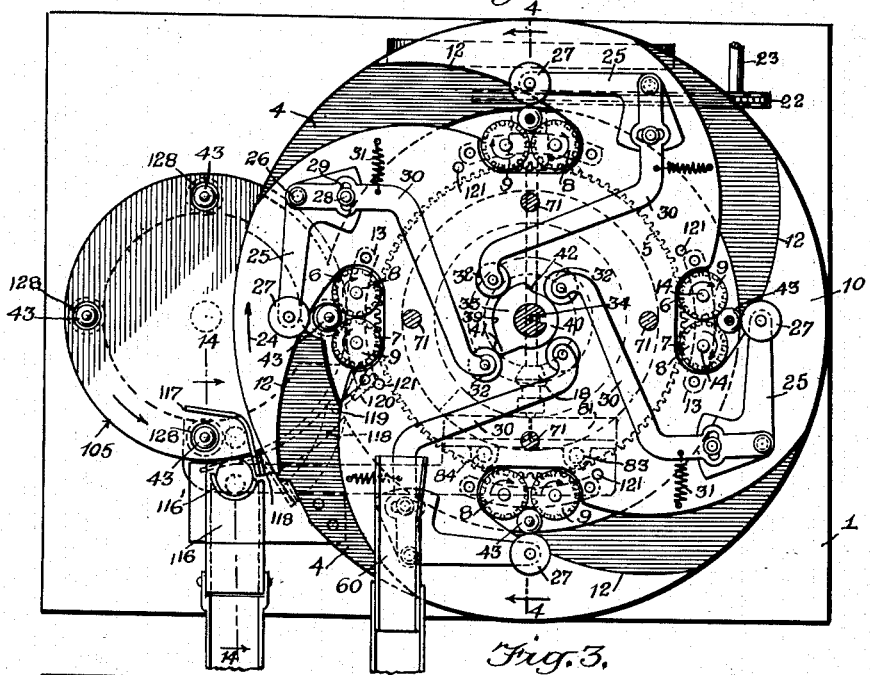
Fig. 2 is a sectional view through Fig. 1 approximately on the line 2—2.

As shown in Fig. 2, there is provided a bell crank lever 25 for each notch 12 and these bell crank levers are pivotally mounted by suitable pins 26 on plate 10. A pressure roller 27 is rotatably mounted at the outer end of one of the legs of the bell crank lever 25 while the opposite end carries a clamping bolt 28 which extends through a slot 29 in the lever 30. Lever 30 is pivotally mounted on a pin 26 and is urged in one direction by a spring 31. A contact roller 32 is arranged at the free end of lever 30 and this contact roller is adapted to bear continually against a stationary cam 33. Cam 33 is keyed or otherwise rigidly secured to a stationary shaft 34, which shaft is secured to a cam 35 by a pin 36, as shown in Fig. 4. Cam 35 is rigidly secured to base 1 in any desired manner, as for instance, by means of a bolt 37 to an upright 38, which upright is welded or otherwise rigidly secured to base 1, as illustrated in Fig. 4. Cam 33, as shown in Fig. 2, is provided with an arc-shaped surface 39, a second arc-shaped surface 40, a projecting cam portion 41, and an inclined portion 42. As the plate 10 rotates the roller 32 of each of the levers 30 successively move over the different surfaces just mentioned. When the roller 32 is engaging the projecting cam portion 41, the pressure roller 27 is swung entirely free of the ampoule 43 arranged in one of the notches 12. As the roller 32 moves off the cam extension 41, it moves on to the surface 39 which holds the transfer roller 27 a short distance from the ampoule but as soon as the roller 32 moves down the incline 42 the roller 27 is pressing the ampoule 43 against the rollers 8 and 9 and as all parts are traveling at the same speed the ampoule will be rotated. This rotation will continue until the roller 32 again strikes the cam projection 41.

The ampoule 43 is placed manually or by means of a suitable chute in the position shown by the letter A in Fig. 10. When in this position the ampoule is resting on the ring 4 or partly on the ring 4. As shown in Fig. 10, the ampoule is resting partly on the ring 4 and leans against the rollers 8 and 9. As the roller 32 will quickly move off the cam extension 42, the roller 27 rather quickly moves the ampoule over until it is held loosely between the rollers 27 and 8 and 9, said loose holding being maintained until the roller 32 moves off surface 39, which it does when reaching the station B. As shown in Fig. 10, the burner 44 is lowered or swung downwardly at station B until the flame can strike the ampoule a little below the top end thereof.

There is a burner 44 and associated parts for each four notches 12 in plate 10, but for the purpose of clearness in Figs. 1 and 10 only one burner has been illustrated but as all the burners and associated parts are identical this showing and a description thereof will apply to all burners. As illustrated in Fig. 1, gas is supplied through a suitable hose or pipe 45 and air through a pipe 46. Valves 47 and 48 control the flow of air and gas so that a desirable combustible mixture is directed into the passageway 49 of the valve member or key 50, which is rigidly secured to the stationary shaft 34. A valve casing 51 is mounted on the key or valve member 50 and rotates around the same. A suitable washer 52 and nut 53 hold these parts in functioning position. By this construction a combustible mixture is continually supplied to a flexible hose 54 and this hose supplies the mixture to a burner pipe 55. Pipe 55 is secured to a bar 56 (Fig. 8) which is pivotally mounted at 57 to a block 58, which block is rotatably mounted on the stationary shaft 34. The pipe 55 at the outer end carries the burner 44, which preferably directs the flame horizontally and in a sheet against the ampoule 43 near the upper end thereof.

The parts are so proportioned that the burner will begin to heat the upper part of the ampoule at station B, as shown in Fig. 10, and heat the same until the ampoule reaches station C, as shown in Fig. 10, whereupon the grippers or jaws 59 will grip the upper end of the ampoule immediately above where the flame strikes the ampoule. Means hereinafter fully described will cause the grippers 59 to quickly close and then rather slowly move upwardly a very short distance, as for instance, one-sixteenth or one-eighth of an inch. It will be understood that while these actions are taking place the ampoule is being rotated by the rollers 8 and 9. After the first initial upward movement, the grippers 59 will move upwardly quickly until the gripped portion of the ampoule will break loose as it moves upward into a cold zone. The remaining part of the ampoule will remain as shown in Fig. 8 so that the fused glass will flow or settle down and cause the top of the ampoule to be smoothed and sealed over properly. The twisting and initial upward movement causes the sealing action and then a quick movement causes the breaking of the top portion of the glass from the remaining part. After a short initial upward movement the burner and the grippers 59 move upwardly rather quickly and continue to rotate with the plate 10. When the parts reach station D, shown in Fig. 10, the grippers will open and drop the portion of ampoule that has been raised and broken off from the ampoule. This broken-off part is dropped at station D and lands on a chute 60, as shown in Fig. 2. The burners 44 continue to provide a flame regardless of their position, as long as the machine is operated, but this flame merely functions from the station B, as shown in Fig. 10, to a short distance beyond station C. In order to cause the burners 44 to swing down to functioning position at station B and then swing up to a non-functioning position at station C, there is provided a stationary cam 61 (Figs. 1 and 8). This cam is provided with an upper surface 62 and a lower surface 63 and a pair of inclined surfaces 64 and 65. The bar or block 56, as shown in Fig. 8, is provided with a bracket 56' carrying a wheel 56" resting on the cam 61. It will be understood that there will be a wheel 56" and associated parts for as many burners as may be used but there will be only one cam 61 which cam is rigidly secured to the shaft 34, and, therefore, is held stationary.

Above the cam 61 a gripper releasing cam 66 is provided, said gripper releasing cam being provided with a base plate 67 (Fig. 1 and 13) keyed or otherwise secured to shaft 34, an upstanding annular ring 68 having a notch 69, and an upstanding abutment 70. A gripper rod 71 is associated with each of the grippers 59. Each of these gripper rods is arranged so that the lower ends will rest on the upper surface of the cam 35. This cam, as shown in Figs. 5 and 6, is provided with a horizontal cam surface 72, an inclined cam surface 73, a slightly upwardly inclined cam surface 74, a notch 75, and a raised horizontal cam surface 76. There is provided a vertical shoulder 77 between the surfaces 72 and 76 and the respective gripper rods 71 are adapted to drop down from surface 76 to surface 72 at certain times as hereinafter described, said rods moving to the right as shown in Figs. 5 and 6. Associated with the cam 35, there is provided an elevating structure 78 operating in notch 75. This structure is shown in detail in Fig. 7 from which it will be seen there is provided a horizontal bar 79 having an offset block 80 at one end and a channel iron 81 at the opposite end. An arc-shaped cam plate 82 is secured to the top of the channel iron 81 and in operation is adapted to be brought into register with the end 76' (Fig. 6) of the raised cam surface 76 when the bar 79 has been moved upwardly to its highest position. A pair of guide tubes 83 and 84 slidingly surrounding guide rods 83' and 84' are rigidly secured to bar 79 and also an upstanding bracket 85 which has an arc-shaped section 86 positioned to engage the respective rollers 87 (Fig. 1) for raising the same as hereinafter fully described. A roller 88 (Fig. 4) is arranged in the channel iron 81 and a pin 89 extends therein, said pin being rigidly secured to the outer end of crank 90 secured rigidly to shaft 19. It will, therefore, be seen that the elevator 78 moves upwardly and downwardly as shaft 19 functions and, therefore, moves upwardly and downwardly in proper time with the rotation of plate 10.

As shown in the accompanying drawings, the bevel gear 18 and gear 17 are proportioned four to one so that there will be four rotations of shaft 19 to one rotation of plate 10 and, consequently, four complete cycles of the elevator 78 for each single rotation of plate 10. If there were more or less notches 12 in plate 10, the relation would be changed accordingly.

During the functioning of the machine, the respective gripper rods 71, for instance, will move down the inclined surface 73 of cam 35, then upwardly over the surface 74 (Fig. 5) and then on to the cam plate 82. The parts are so proportioned that each rod 71 as it reaches the upper end of cam surface 74 will move on to the plate 82 as the plate is in line at this time with the upper end of surface 74. Immediately on the movement of the lower end of rod 71 on to plate 82, said plate will begin to move upwardly and this movement is rather quick. As the plate 82 moves upwardly the rod 71 is moving along the surface of this plate so that as soon as the crank 90 reaches dead center on its upward stroke, the plate 82 will be in line with the surface 76 and rod 71 will move off said plate 82 on to surface 76. The rod continues to move and eventually will drop off shoulder 77 on to the horizontal surface 72 and continue to move until it reaches the inclined surface 73. This completes one cycle and all the rods 71 go through the same cycle in succession and as soon as one cycle has been completed a new cycle starts. From Fig. 4 it will be observed that the tubular depending members 15 act as guides for the respective rods 71, there being a tubular guide for each rod. Adjacent the upper end of each rod there is provided a gripper 59 and associated parts.

As shown in Figs. 1 and 8, the rods 71 slide through suitable tubular brackets 91 connected with the tubes 55 of the respective burners so that these tubes, burners and associated parts are swung around the stationary shaft 34 with the rod 71. A fitting 92 (Fig. 1) is secured to each rod 71 by a set screw or other means and each of these fittings carries preferably two clamping bolts 93. These bolts extend through suitable slots 94 in a bar 95, whereby the bar 95 may be adjusted to the right or left, as shown in Fig. 1, so as to vary the radial position of the grippers 59. Each of these grippers is provided with a pair of gripping jaws and these jaws are pivotally mounted at 96 and 97 respectively on bar 95. Each of the jaws or grippers 59 is in the form of a bell crank lever with one end of the jaws forming the gripping points 98 and the other end pivotally connected to a link 99, which in turn is pivotally connected to an extension 100 preferably formed integral with a weight 101. This weight is pivotally mounted at 102 on an upstanding bracket 103 carried by the bar 95. The weight 101 has a large elongated slot through which the rod 71 loosely extends, whereby the weight 101 may swing upwardly and downwardly freely as far as the rod 71 is concerned. When released, weight 101 will move downwardly under the action of gravity to a horizontal position and will, consequently, move link 99 so as to close the jaws of the gripper 59. This action takes place whether the gripper is gripping an ampoule or the gripper is held in the air.

When the parts are in the position shown in Fig. 1, the gripper 59 and associated parts may be arranged as shown at station E. As the machine continues to function, the parts arranged as shown at station E will remain in this position by reason of the rod 71 resting on cam surface 72 but will swing around to near station F. As soon as the rod 71 begins to move down the inclined surface 73 (Fig. 6) rod 71, gripper 59 and associated parts will move downwardly until the free end of weight 101 strikes the ring 68 of cam 66 and as the rod continues to move downwardly until it comes to the point 74', bar 95 will move in a certain sense downwardly away from the weight and thereby cause the weight to be held as shown at station F. This results in the opening of the jaws of gripper 59, which will remain open as the parts further descend and move in a circle. Immediately before the rod 71 reaches the point 74' in Fig. 5, weight 101 will move off the end 104 of the ring 68. As soon as the weight drops off ring 68 at 104, the jaws of the gripper will quickly close and grip the upper end of the ampoule 43. By this time the burner 44 has heated the ampoule immediately below its upper end to a fusing consistency and, consequently, as soon as the grippers grip the upper end of the ampoule the softened part will be twisted as the ampoule is being rotated. Also at substantially the same time the rod 71 begins to move up the short incline 74 of cam 35 and will slowly pull upwardly on the upper end of the ampoule as the same is rotated. This will twist the softened and almost molten part of the ampoule so that a good sealing action will be secured. The short slow upward twisting movement of the ampoule continues until the rod 71 has moved on to the cam plate 82 of elevator 78, whereupon the upper end of the ampoule is raised rather quickly upwardly and the glass pulled out thin and broken. As this occurs the heat already applied will cause the glass at the upper end of the ampoule to become smooth so as to properly seal the ampoule. Also as the elevator begins to function to raise the rod 71, grippers 59 and associated parts, the burner 44 will begin to rise by reason of the functioning of the rollers 56" (Fig. 8) and the sealed ampoule will continue to move toward its discharge point. As the gripper 59 and associated parts move upwardly they also move in a circle by reason of the fact that the table 10 is rotating and is moving the various rods 71 in a circle. The gripper remains closed until the rod moves off the cam section 82 and also moves off the cam surface 76 (Fig. 6). As soon as the rod falls over the shoulder 77, the jaws will be opened temporarily and allow the glass held thereby to drop on to the chute 60. The parts are so proportioned that when the rod 71 is about to drop off the shoulder 77, the weight 101 is immediately above the upstanding abutment 70 of cam 66. By reason of this fact, when the rod drops off shoulder 77, the bar 95 will be quickly lowered, while the free end of the weight 101 will be held supported by abutment 70. This will cause the jaws to open and remain open until the weight 101 has moved off member 70, as shown at station E in Fig. 1. As soon as the weight has moved off member 70, the grippers 59 will close and remain closed until they reach substantially station F in Fig. 1 and the operation is then repeated.

Each of the rods 71 performs the function just described and is provided with grippers and associated parts as set forth. From this it will be observed that the ampoules are placed in position on ring 4 at station A (Fig. 10) and is then moved to stations B, C and D, after which they are moved from station D to a discharge point.

Figure 3:
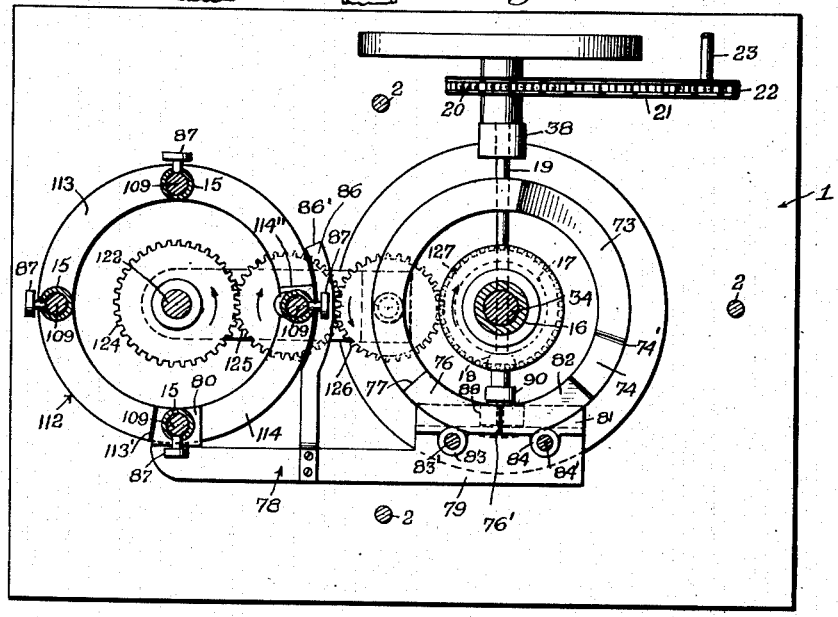
Fig. 3 is a sectional view through Fig. 1 approximately on the line 3—3.

Between stations D and A, as shown in Fig. 10, there is provided a cooling turntable 105, which underlaps the supporting ring 4 and may contact therewith. Ring 4 (Fig. 10) is provided with an arc-shaped passageway 106 extending from the inner to the outer edge of the ring and parallel to the periphery of the turntable 105. As the rollers 8 and 9 and also the rollers 27 move the ampoule from station D toward station A, the ampoule will approach the passageway 106 and approximately at this time the roller 27 begins to release the ampoule, the ampoule will be allowed to rest on the top of one of the plungers 109 of turntable 105 near the beginning of the passageway 106 so that the ampoule will move with the table and pass through passageway 106. The cooling turntable 105 is formed with a circular top 107 having four tubular downwardly extending members 108 which are open at the top and bottom. In each of these tubular members is arranged a plunger 109 round at the lower end and square at the upper end, as shown at the left in Fig. 1. Also each of the tubular members 108 is provided with a vertical slot 110 through which a pin 111 extends. A roller 87 is rotatably mounted on each of the pins 111 and when this roller is raised the plunger 109 will be raised. Also under some circumstances means hereinafter fully described act on the lower end of the respective plungers 109 for raising the same. The plungers 109 at their lower ends are adapted to rest on a support 112 (Fig. 12), which support is provided with a horizontal surface 113 and an elevated surface 114. There is a short distance between the end 114' of surface 114 and the end 113' of surface 113, as shown in Figs. 3 and 12, whereby the offset member or block 80 of elevator 78 may move up so that its upper surface will be in line with the surface 114. When the elevator 78 is in its highest position, the upper surface of block 80 is in line with the surface 114, as illustrated in Fig. 1, whereby the lower end of the plunger 109 resting on block 80 may move over on to the surface 114 as the table 105 moves. It will be understood that the turntable 105 is rotated in a direction indicated by the arrow 115 in Fig. 1. As soon as plunger 109 moves from block 80 on to the surface 114, the elevator 78 begins to move downwardly but the plunger 109 on surface 114 continues to move to the right as shown in Fig. 1. This movement is continued until the plunger moves off of the surface 114 at the end 114". Before this occurs, the arc-shaped support 86 of elevator 78 is engaging the roller 87 so as to hold the roller against dropping down on to surface 113 until the roller 87 has moved off the end 86'. As the plunger 109 moves from the end 114", the roller 87 will act as a support for the plunger but as this roller is supported by the elevator 78 the plunger will begin to move downwardly and this downward movement continues until the roller moves off end 86', whereupon the plunger will drop by its weight on to the surface 113 and will remain on this surface until it again moves on to the upper surface of block 80.

As shown in Figs. 2 and 3, one of the plungers 109 is near the end of surface 114 at the time the ampoule enters the passageway 106 and, consequently, the ampoule is deposited on the upper end of the plunger. As the turntable and plunger move, the ampoule will be gradually lowered with the movement of the elevator 78 for a short distance and then as roller 87 moves off support 86 the plunger drops and ampoule will drop with it until the ampoule is completely within the member 108 as shown at the left in Fig. 1. The ampoule and plunger remain in the lowered position with the lower end of the plunger resting on surface 113 and are allowed to cool until the plunger again reaches the block 80, which has been lowered and is ready to receive the plunger. As soon as it reaches the plunger it immediately begins to move upwardly and will thereby move the filled cooled ampoule until the bottom surface thereof is flush with the upper surface of the cooling turntable 105. The ampoule remains with the bottom surface flush with the upper surface of the turntable 105 until it reaches the ampoule discharge chute 116, as shown in Figs. 2 and 14. When the ampoule reaches a point opposite the chute 116 it is quickly forced into this chute and dropped by gravity through the chute to a suitable discharge point. An L-shaped wiping plate 117 is provided, as shown in Figs. 2 and 14, said plate at one end being rigidly secured to a swinging bar 118 pivotally mounted at 119 on the ring 4. This bar has an extension 120 and the table 10 is provided with a pin 121 which strikes the extension 120 near the end as the table 10 moves. This will swing the bar 118 and move the wiping plate 117 so as to force the filled and sealed ampoule into chute 116. As each filled and sealed ampoule approaches the wiping plate 117, it is forced into chute 116.

In operation, after the machine has been started, an ampoule is placed in the position shown at station A in Fig. 10 or near this position. This ampoule and associated parts will move to station B where heat is first applied and as the parts move to station C the grippers 59 move down and grip the upper end of the ampoule. The upper end of the ampoule is twisted by reason of the rotation thereof and by reason of the holding action of the grippers. For a short time after the grippers engage the ampoule they are raised slightly so that the heat softened part of the ampoule is twisted and caused to collapse and then the grippers with a small portion of the upper end of the ampoule are quickly elevated until the glass cools and breaks. The heated glass at the upper end of the ampoule flows over and presents a smooth finished appearance at this time. As the grippers move upwardly the burner also moves upwardly and rotates at the same time.

After the parts have been moved to station D, as shown in Fig. 10, the grippers open and drop the small part of the ampoule held thereby on to chute 60, while the filled and sealed ampoule continues to move until it enters the passageway 106. The parts are so proportioned that as the ampoule enters the passageway 106, it rests on top of one of the plungers 109 and after the ampoule has entered said passageway a short distance the plunger is lowered until the top of the ampoule is below the top of the turntable 105. As the filled lowered ampoule continues to move with the cooling turntable it arrives at a point where the plunger is moved upwardly for causing the bottom of the ampoule to be flush with the top of the turntable. Shortly after this action the wiper plate 117 forces the filled, sealed and cooled ampoule into the discharge chute 116 and the operation is completed.

In Fig. 2 four notches 12 are provided and all the parts are of a corresponding number so that four ampoules may be in the machine at one time. It will be understood, however, that one ampoule is inserted at a time and one ampoule is discharged at a time.

I claim:

1. An ampoule sealing machine comprising a support for an ampoule, a plurality of power driven rollers for rotating and moving the ampoule along said support from an entrance position to an exit position, means for heating part of the ampoule during part of its travel along said support, a pair of non-rotatable grippers, means for causing said grippers to function for gripping and slightly raising one end of the ampoule near the end of the heating period whereby the heated part will be twisted and elongated simultaneously, means acting to quickly and appreciably raise said grippers after said twisting and elongating action for removing the gripped part of the ampoule, and means for opening said grippers shortly after they have been raised for discharging the gripped part of the ampoule.

2. A sealing machine for sealing glass ampoules including a support on which an ampoule is adapted to be positioned, means for heating that part of the ampoule between the body and the outlet end until it becomes substantially fused, a pair of grippers, means for causing said grippers to grip the ampoule adjacent said outlet end and immediately slightly raise the grippers for elongating said substantially fused part, means for rotating all of the ampoule except that part held by said grippers while the grippers are raising, and means for appreciably raising said grippers after the initial raising movement for disconnecting that part of the ampoule gripped by said grippers from the substantially fused part.

3. A sealing machine for sealing a glass ampoule including an ampoule support for moving an ampoule in a given path, a burner for directing a flame against the ampoule near the discharge end thereof until that part of the ampoule engaged by said flame is substantially fused, means for moving the burner along the path traveled by the ampoule while heat is applied to the ampoule, means for rotating the ampoule while heated, means gripping and holding stationary the discharge end of the ampoule while the ampoule is still heated and is being rotated for removing the part of the discharge end of the ampoule not fused, and means for moving said burner down to a position for heating a part of the ampoule during part of the travel of the ampoule, said last-mentioned means acting to hold the burner in position for heating the fused part of the ampoule after said discharge end has been moved upwardly away from the ampoule.

4. A sealing machine for sealing a glass ampoule including a stationary ring for supporting ampoules to be sealed, means for rotating each ampoule resting on said ring and at the same time moving the ampoules from an entrance point on the ring to a discharge point, a burner for each ampoule on said ring, means for moving said burners at the same speed as said ampoules, means for swinging said burners downwardly into functioning position and later upwardly out of functioning position while the burners are moving in a circle, the last mentioned means functioning to hold the burners in position for heating to a substantial fusing point the upper part of the ampoules during part of the travel of the ampoules, and means for twisting and elongating the fused part of the ampoules while in a state of flux.

5. A sealing machine for sealing glass ampoules including a stationary ring having an arc-shaped passageway at one point, a rotatable notched plate positioned to extend over said ring, the notches in said plate being arc-shaped and extending inwardly from the periphery of the plate to a point beyond the inner edge of said ring, a bar secured to said plate for each of said notches extending across the notches near their inner ends, a pair of friction rollers rotatably mounted on each of said bars positioned with their axes parallel with the axis of said plate, a gear wheel secured to each of said rollers, a stationary gear ring having gear teeth on its periphery continually in mesh with said gear wheels whereby when said plate is rotated all of said friction rollers will be rotated, a spring actuated roller for each of said pairs of friction rollers positioned to press an ampoule against the friction rollers whereby the ampoules will be rotated and moved around said ring as said plate rotates, means for heating part of the stems of the ampoules to a fusing point during part of the travel of the ampoules around said ring, means for gripping and slightly raising the end of the stems of the ampoules near the end of said heating period whereby the fused point will be twisted and elongated for producing a sealing action, means for quickly raising the gripping means and means for releasing the ampoules as they approach the arc-shaped passageway in said ring whereby the ampoules may enter said arc-shaped passageway and move to a discharge point.

6. A sealing machine for sealing glass ampoules including an ampoule support, a burner for directing a flame against the ampoule near the discharge end thereof until that part of the ampoule engaged by the flame is substantially melted, means for rotating the ampoule and means for gripping and raising the end of the ampoule until the melted part is twisted and elongated until it is broken, said last mentioned means including a gripper, a rod for carrying said gripper, means for moving said rod and parts into functioning and non-functioning position, means including a weight for closing said gripper, and means including a cam for moving said weight for opening said gripper.

7. A sealing machine for sealing filled glass ampoules including a stationary ampoule support, means adjacent said support for rotating and moving in a circle ampoules resting on said support, said means including a pair of friction rollers, mechanism for rotating said friction rollers, a rotatable plate carrying said friction rollers, a spring pressed roller for holding the ampoules against said friction rollers, means for heating one end of the ampoules as they move with said rotatable plate, a gripper for gripping and holding against rotation the upper end of each ampoule after it has been heated, means for moving said gripper and the heating means away from the ampoule, and means for moving the ampoule to a discharge point after the gripper has moved away from the same.

8. In a sealing machine for sealing glass ampoules, a cooling turntable for receiving the ampoules after they have been sealed, said turntable including a rotatable top provided with a plurality of apertures near the periphery and tubular members extending downwardly from the top in line with the apertures, a plunger arranged in each of said apertures, means for raising and holding the plungers so that the upper ends will be flush with the top of said turntable when an ampoule is deposited on the turntable, said turntable being so proportioned that the ampoules as they are fed on to said cooling turntable will rest on the upper end of one of the plungers, said plungers automatically moving downwardly as the turntable moves so that the ampoules will be lowered into said tubular members for part of the travel of the turntable, an elevator for elevating said plungers in succession for raising the ampoules, a cam for supporting the respective plungers when raised until the ampoules carried thereby have rotated a predetermined point, a swinging wiping member arranged adjacent said predetermined point, and means for causing the wiping member to function to force an ampoule bodily off the turntable when reaching said predetermined point and a chute for receiving the ampoule as it is forced off said turntable, said chute guiding the ampoule to a discharge point.

9. A sealing machine for sealing glass ampoules including an ampoule-supporting ring, means for holding said ring stationary, a rotatable plate arranged on top of said ring, said plate having a plurality of arc-shaped notches extending from the periphery inwardly beyond the inner edge of said ring, said plate having a tubular depending central member provided with a bevel gear at the lower end, a stationary shaft extending through said tubular member and to a point appreciably above said plate, means including a bevel gear for rotating said tubular member and plate, a crank actuated by said means, an elevator raised and lowered by said crank, a cam surrounding said tubular member, said cam having an opening in which said elevator functions, said plate having a plurality of spaced depending tubular members, a rod slidingly positioned in each of said tubular members, the lower ends of said rods being adapted to slidingly rest on said cam for most of their movement and on said elevator for the remaining part of their movement, a gripper carried by each of said rods, a stationary cam carried by the stationary shaft, a burner for each of said notches rotatably mounted on said shaft above said stationary cam, each of said burners having a burner head for directing a flame in a given direction, a bracket carried by said burner having a roller acting on said stationary cam, means connecting the respective burners with the respective rods so that the burners will rotate at the same speed as the rods move in a circle, the first-mentioned cam being formed to cause said gripper to grip the end of an ampoule while said burner is heating the ampoule near the end, said elevator and the stationary cam acting on the burners simultaneously for raising the gripper and the burners immediately after the gripper has gripped the upper end of an ampoule, and means coacting with the gripper for opening the same shortly after it has been raised for releasing the glass particles carried thereby.

10. In a sealing machine for sealing glass ampoules, means for heating the ampoules near the discharge end thereof, a gripper for gripping the ampoules near the discharge end, a cam for causing the gripper to slightly elongate the heated part of the ampoule, an elevator for quickly elevating the gripper, said elevator moving the gripper an appreciable distance for causing the heated part of the glass to break, and means for opening the gripper for releasing the glass portion carried thereby before the next operation.

11. In a sealing machine for sealing glass ampoules, a plurality of reciprocating rods, means for moving the rods in a circle, an ampoule gripper connected with each of said rods, a single elevator acting on the rods in succession for elevating the same, said elevator including an elongated bar, a pair of guiding tubes, an arc-shaped cam plate, and means forming a channel iron, a roller arranged in said channel iron, a pin extending into said roller, and a power driven crank carrying said pin for moving the pin in a circle, whereby the elevator is raised and lowered at a regular rate as the power means functions.

12. In a sealing machine for sealing glass ampoules, a plurality of ampoule grippers, a reciprocating rod for each of said grippers, means for moving said rods in a circle, a cam arranged beneath said rods and supporting the rods for most of their travel, said cam having an opening in one face, an operating cam surface, a horizontal section at a given elevation, a second horizontal section offset from the first-mentioned horizontal section a short distance, a comparatively long inclined section and an upwardly inclined section extending from the bottom of the long inclined section, and an elevator having a cam plate adapted to register with the last-mentioned section of the cam when in its lowest position and register with the first-mentioned cam surface when in its highest position, whereby when said rods move over the cam surfaces they will in succession move on to the elevator and be lifted to the first-mentioned cam surface and then continue their movement for a repeated action.

13. A sealing means for sealing glass ampoules as set forth in claim 4, characterized by means for providing a combustible mixture for said burners, said means including a flexible pipe connected with each of said burners, a supply pipe, a stationary hollow fitting for receiving a combustible mixture from said supply pipe, a sleeve rotatably mounted on said fitting, said sleeve having an interior annular groove continually in free communication with the interior of said fitting and means for connecting one end of each of said flexible pipes to said sleeve so as to be continually in communication with said groove.

14. A sealing machine for sealing glass ampoules including a rotating ampoule support for moving the ampoules in an arc-shaped path, means for rotating individually ampoules placed on said support while they are moving in said path, a burner for directing a flame against an ampoule near the discharge end as the ampoule moves through a certain zone for fusing that part of the ampoule engaged by said flame, means for moving said burner down to the ampoule as the ampoule enters said zone and then along with the ampoule at the same speed thereof, means for gripping and holding stationary the discharge end of the ampoule while the ampoule is still heated for removing that part of the discharge end of the ampoule not fused and means for raising said burner near the outlet end of said zone after said discharge end has been removed.

15. A sealing machine for sealing glass ampoules including a support on which an ampoule is adapted to be positioned for moving the ampoule in a given path, means for heating that part of the ampoule gripped by the grippers from the substantially fused part, a pair of power-driven rollers for rotating the ampoule, a third roller movable toward and from said pair of rollers for holding an ampoule in rolling contact with said pair of rollers and means for moving said third roller away from said pair of rollers for releasing the ampoule.

FRANK COZZOLI.